United States Patent [19]

Levinson et al.

[11] Patent Number: 4,815,805
[45] Date of Patent: Mar. 28, 1989

[54] DYNAMIC RANGE REDUCTION USING MODE FILTER

[75] Inventors: Frank H. Levinson, Redwood City; Steve Lavelle, San Francisco; Thomas E. Giles, Union City; Joseph Zucker, Foster City; Bruce D. Campbell, Portola Valley, all of Calif.

[73] Assignee: Raychem Corp., Menlo Park, Calif.

[21] Appl. No.: 119,619

[22] Filed: Nov. 12, 1987

[51] Int. Cl.$^4$ .................... G02B 6/28; G02F 1/00
[52] U.S. Cl. .................. 350/96.16; 350/96.15; 350/96.20; 350/311; 455/600; 455/617; 455/612
[58] Field of Search ............ 350/96.10, 96.15, 96.16, 350/96.17, 96.18, 96.30, 96.20, 311; 455/600, 617, 612; 250/227

[56] References Cited

U.S. PATENT DOCUMENTS

| | | | |
|---|---|---|---|
| 3,773,289 | 11/1973 | Gloge | 350/96.15 X |
| 3,936,631 | 2/1976 | Muska | 250/227 |
| 3,982,123 | 9/1976 | Goell et al. | 250/227 |
| 4,019,051 | 4/1977 | Miller | 250/227 |
| 4,053,764 | 10/1977 | Sierak et al. | 250/227 |
| 4,076,375 | 2/1978 | Muska et al. | 350/96.15 |
| 4,135,780 | 1/1979 | Dyott | 350/96.15 |
| 4,165,150 | 8/1979 | Duck et al. | 350/96.15 |
| 4,252,403 | 2/1981 | Salisbury | 350/96.15 |
| 4,253,727 | 3/1981 | Jeunhomme et al. | 350/96.15 |
| 4,266,851 | 5/1981 | Salisbury | 350/96.15 |
| 4,381,137 | 4/1983 | Berg et al. | 350/96.15 X |
| 4,475,789 | 10/1984 | Kahn | 350/96.15 |
| 4,549,782 | 10/1985 | Miller | 350/96.16 |
| 4,557,550 | 12/1985 | Beals et al. | 350/96.15 |
| 4,557,552 | 12/1985 | Newton et al. | 350/96.15 |
| 4,558,920 | 12/1985 | Newton et al. | 350/96.15 |
| 4,618,212 | 10/1986 | Ludington et al. | 350/96.20 |
| 4,645,923 | 2/1987 | De Blok et al. | 250/227 |
| 4,676,594 | 6/1987 | Presby | 350/96.29 |
| 4,679,907 | 7/1987 | Campbell et al. | 350/96.15 X |
| 4,696,534 | 9/1987 | Saha | 350/96.15 |
| 4,696,535 | 9/1987 | Saha | 350/96.15 |
| 4,705,347 | 11/1987 | Shen et al. | 350/96.15 |
| 4,728,169 | 3/1988 | Campbell et al. | 350/96.15 |
| 4,749,248 | 6/1988 | Aberson, Jr. et al. | 350/96.15 |

FOREIGN PATENT DOCUMENTS

| | | | |
|---|---|---|---|
| 0190898 | 8/1986 | European Pat. Off. | 350/96.16 |
| 3429947 | 2/1986 | Fed. Rep. of Germany | 350/96.15 |
| 208236 | 3/1984 | German Democratic Rep. | 350/96.15 |
| 52-12845 | 1/1977 | Japan | 350/96.15 |
| 53-75946 | 7/1978 | Japan | 350/96.18 |
| 54-138452 | 10/1979 | Japan | 350/96.15 |
| 54-151455 | 11/1979 | Japan | 350/96.21 |
| 54-155849 | 12/1979 | Japan | 350/96.15 |
| 61-270706 | 12/1986 | Japan | 350/96.16 |
| WO88/01067 | 2/1988 | PCT Int'l Appl. | 350/96.16 |
| 2040493 | 8/1980 | United Kingdom | 350/96.15 |
| 2126749 | 3/1984 | United Kingdom | 350/96.15 |
| 2142157 | 1/1985 | United Kingdom | 350/96.15 |

Primary Examiner—William L. Sikes
Assistant Examiner—Brian M. Healy
Attorney, Agent, or Firm—Dennis E. Kovach; Herbert G. Burkard

[57] ABSTRACT

A mode filter for reducing a dynamic range of a write optical fiber bus which utilizes taps which initially inject optical signals into an optical fiber which have intensities skewed towards higher order modes rather than lower order modes as compared to equilibrium for the fiber functions to preferentially attenuate outermost modes rather than lowermost modes in the fiber so as to reduce a required dynamic range for an optical receiver.

17 Claims, 6 Drawing Sheets

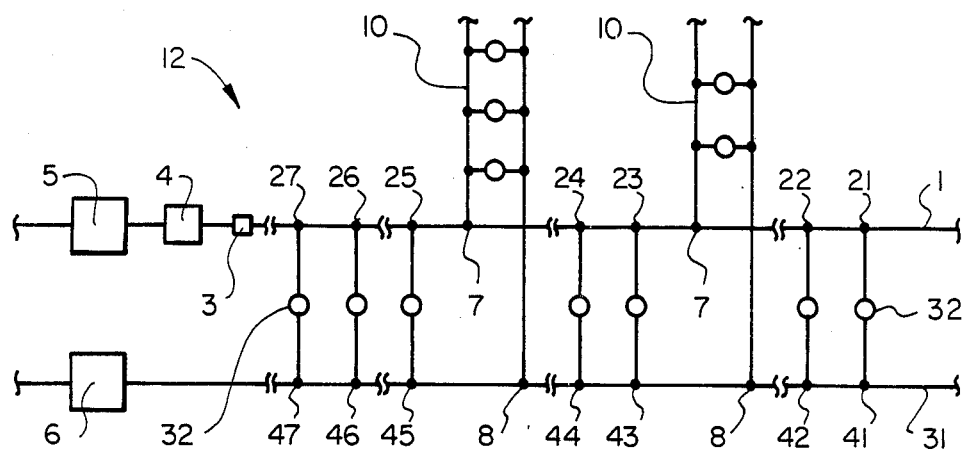
FIG_1
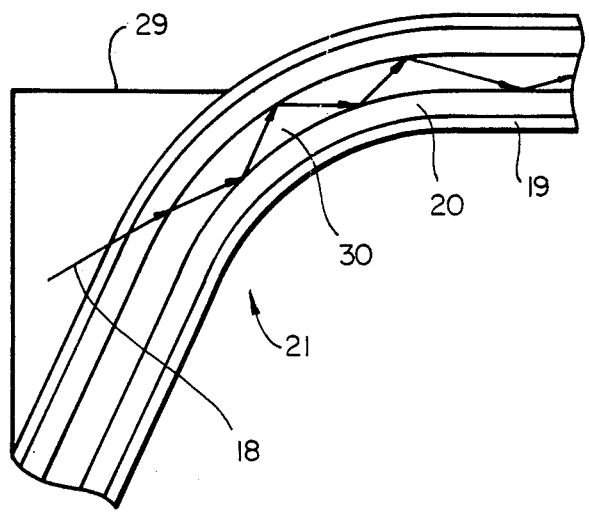
FIG_2

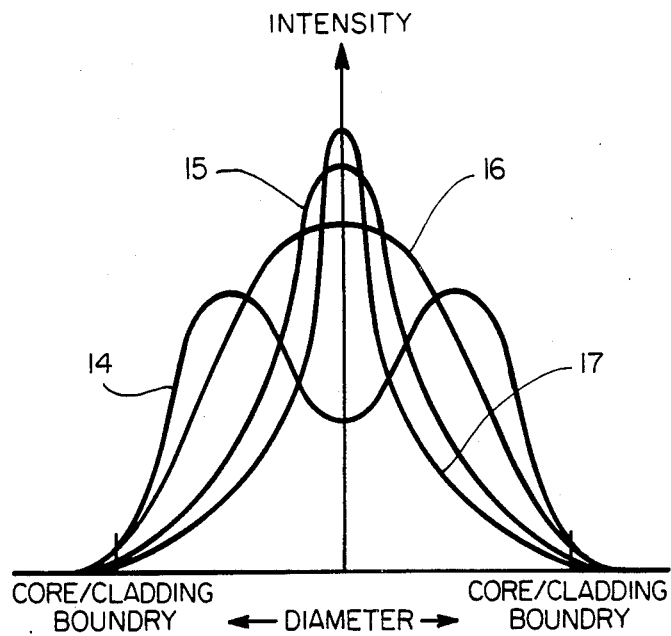
FIG_3
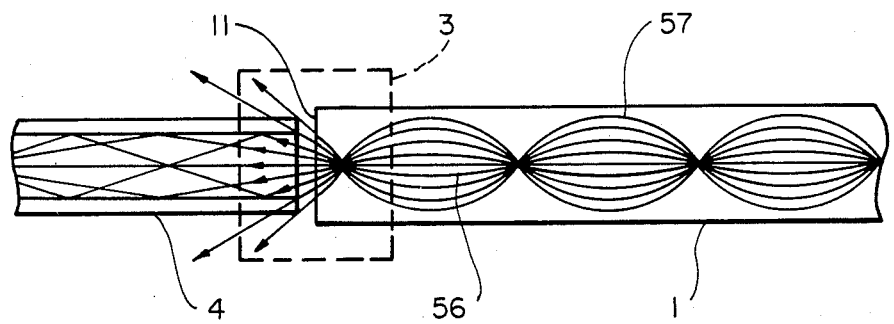
FIG_4a

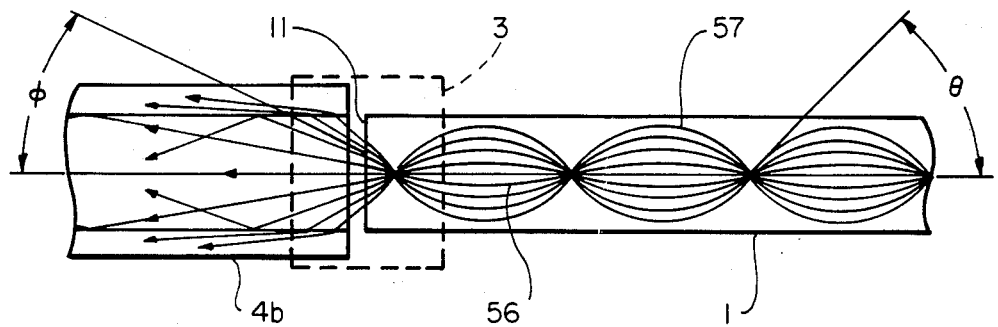
FIG_4b
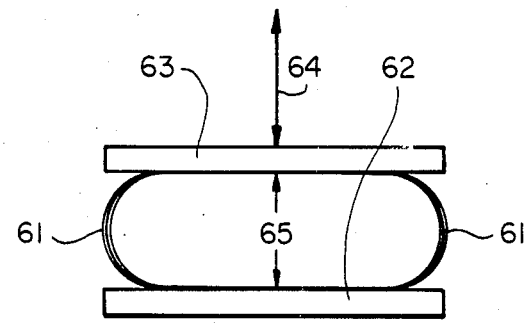
FIG_5
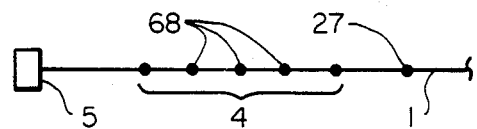
FIG_10

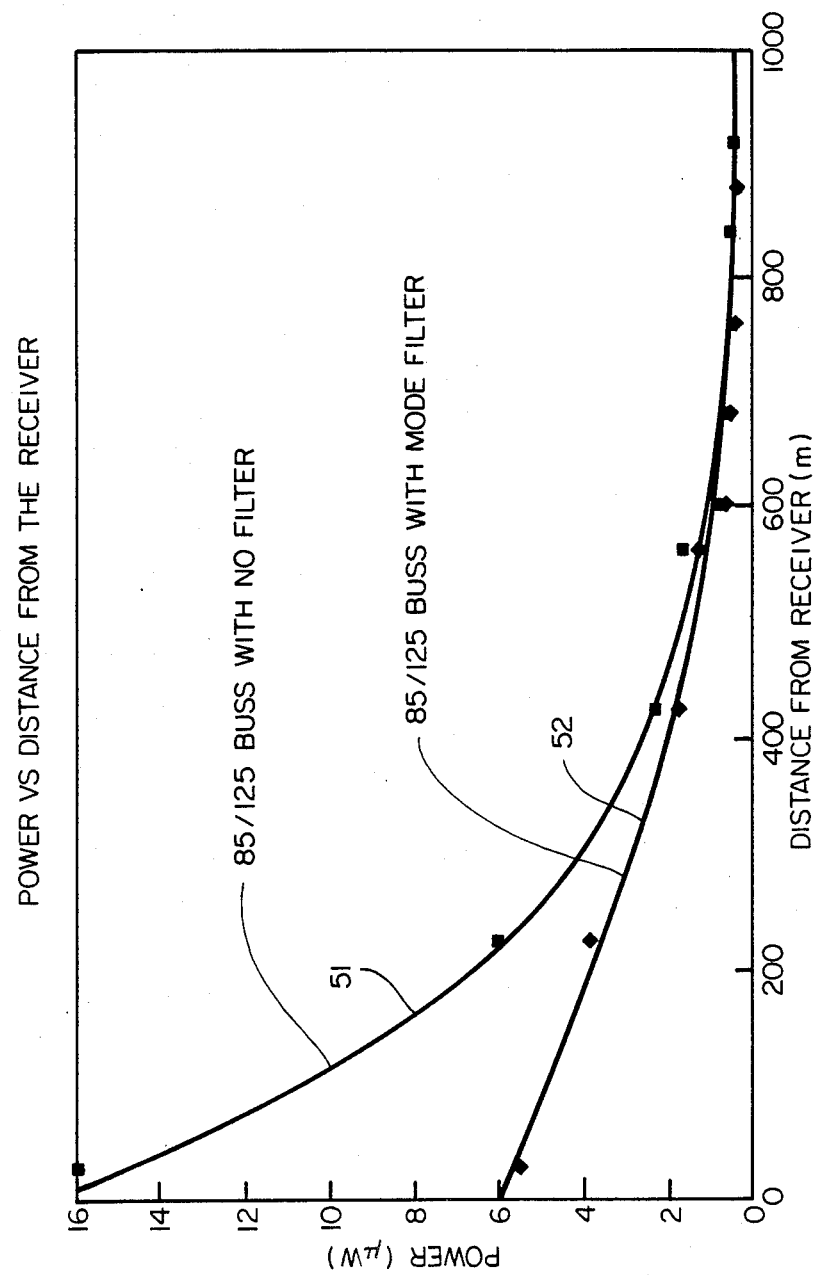

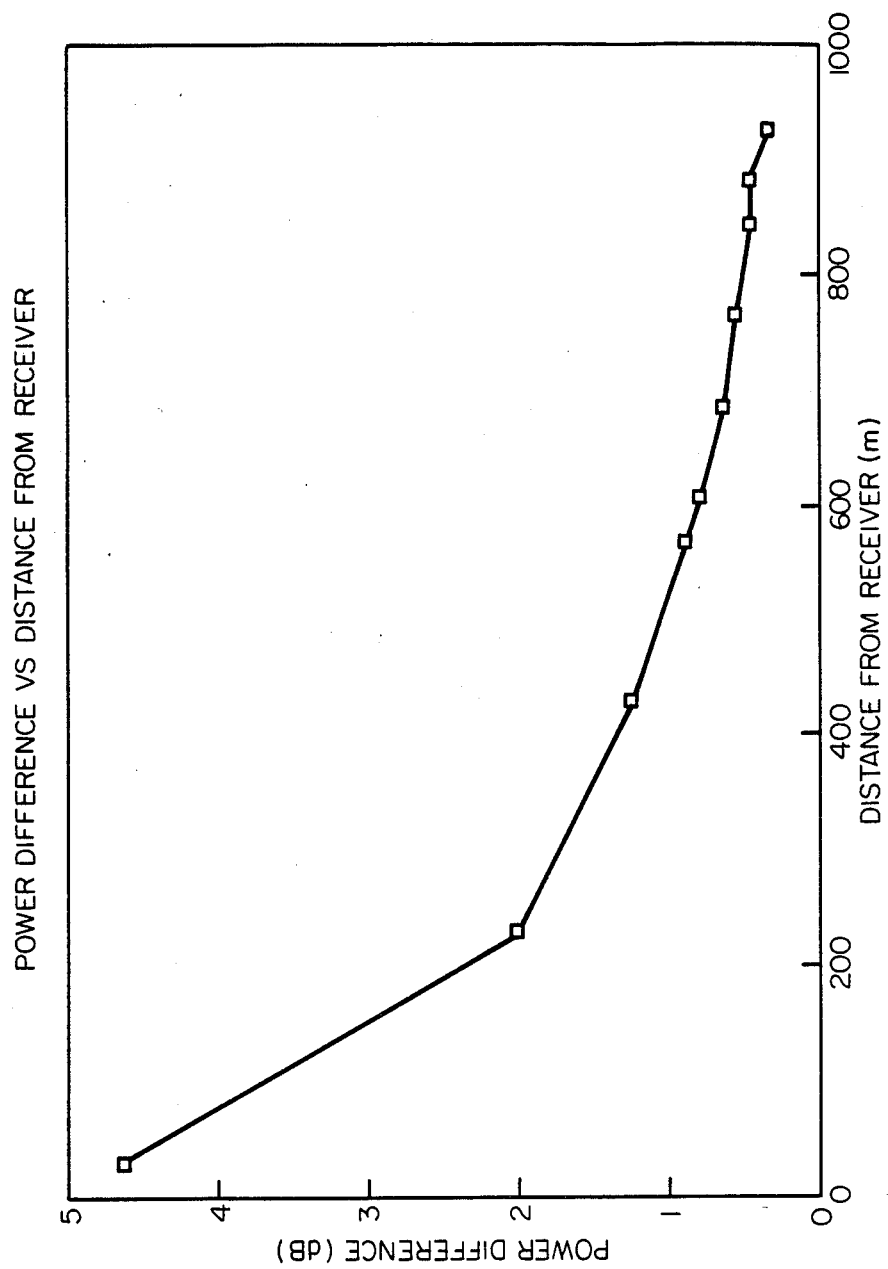
FIG_7

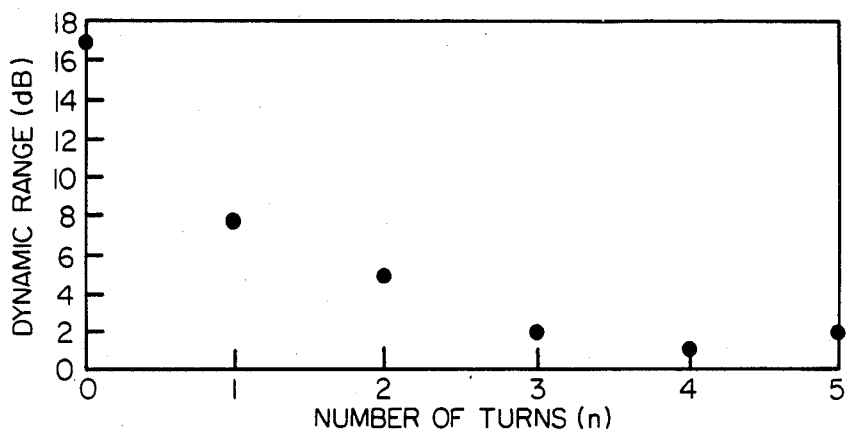
FIG_8
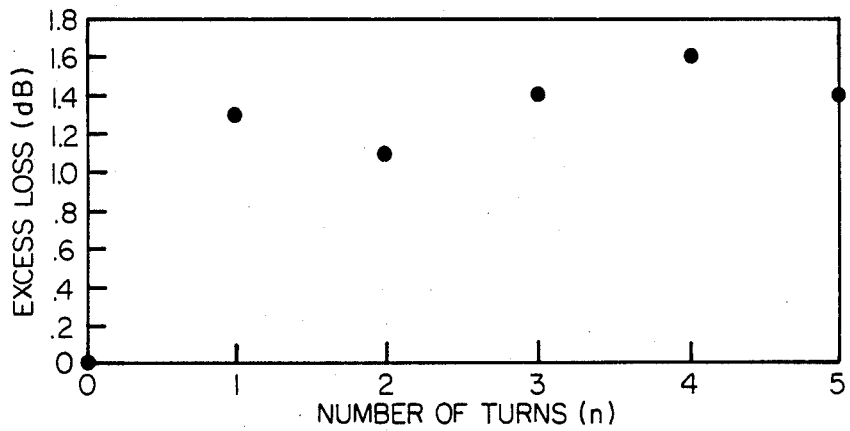
FIG_9

DYNAMIC RANGE REDUCTION USING MODE FILTER

BACKGROUND OF THE INVENTION

The present invention relates to methods and apparatuses for reducing a dynamic range required of an optical receiver utilized in a distributive optical fiber communication system.

Conventionally, when an optical fiber is coupled to an optical receiver, attempts are made to couple as much light within the fiber as is possible to the receiver, preferably 100%. For example, whenever a pigtail waveguide is utilized to connect an end of the fiber to the optical receiver, care is taken to insure that the pigtail waveguide is capable of supporting and propagating all the light being supported and propagated by the fiber at the fiber end. Accordingly, whenever the waveguide comprises an optical fiber, its numerical aperture (NA) and size is chosen so as to be larger than that of the fiber such that the waveguide can successfully transport essentially all the light emitted by the fiber end to the receiver. In addition, a receiver end portion of the distributive fiber is routed so that no bends are created which are less than the minimum bend radius for the fiber so as to minimize attenuations, the minimum bend radius being that radius which does not unduly stress the fiber, a maximum typical specified stress being one-third the fiber proof stress.

SUMMARY OF THE INVENTION

It has unexpectedly and surprisingly been discovered that choosing a waveguide which has a mode volume capacity greater than that of certain distribution fibers and routing the end portion of the distribution fiber so that the minimum bend radius is always exceeded is actually disproportionately disadvantageous when utilized in a distributive optical fiber system having a plurality of light signals separately generated and injected into the fiber in a way which strongly populates outermost modes since a dynamic range of the optical receiver is required to be unduly large.

Accordingly, it is an object of the invention to provide a method and apparatus for reducing a dynamic range of an optical receiver when utilized in a distributive optical fiber system having a plurality of optical sources which inject and multiplex a plurality of optical signals onto a single multimode optical fiber so as to strongly populate outermost modes of the fiber These and other objects of the invention are achieved by an optical fiber distribution system for distributing information for a plurality of subscriber terminals, comprising:

an apparatus for reducing a dynamic range for an optical receiver, comprising:
 a multimode optical fiber;
 a series of write taps serially disposed on the optical fiber;
 an optical receiver located downstream of the series of write taps and having means for receiving light from the optical fiber;
 means disposed between the optical fiber and the optical receiver for attenuating a magnitude of an optical signal generated by a write tap nearest to the receiver substantially more than a magnitude of an optical signal generated by a write tap furtherest from the receiver, a difference between the attenuations being in excess of 1.0 dB.

BRIEF DESCRIPTION OF THE DRAWINGS

FIG. 1 illustrates a first embodiment of the invention whereby an optical filter is disposed in a distributive optical fiber network for reducing a dynamic range of an optical receiver;

FIG. 2 illustrates details of a tap schematically shown in FIG. 1;

FIG. 3 graphically illustrates a mode volume distribution for an injected optical signal for a tap such as that shown in FIG. 2, and various possible equilibrium mode volume distributions for the optical fiber of FIG. 2;

FIG. 4a illustrates one preferred embodiment of a mode filter constructed according to the present invention;

FIG. 4b illustrates a second preferred embodiment of a filter constructed according to the present invention;

FIG. 5 illustrates a third preferred embodiment of a filter constructed according to the present invention;

FIG. 6 illustrates and compares optical powers detected from optical taps at varying distances from an optical receiver when an optical filter as illustrated in FIG. 4a is used and is not used;

FIG. 7 illustrates differences in power levels in dB shown in FIG. 6;

FIGS. 8 and 9 illustrate dynamic range reduction values and attenuation measurements made using an optical filter as illustrated in FIG. 5; and FIG. 10 illustrates yet another preferred embodiment of a mode filter according to the present invention.

DESCRIPTION OF THE PREFERRED EMBODIMENTS

A distributive optical fiber system 12 according to and for use with the present invention is illustrated in FIG. 1. Referring to this figure, a mode filter 4 is disposed between a bus optical fiber 1 and an optical receiver 5, and according to a preferred embodiment the mode filter is used to interconnect the fiber 1 and the receiver 5. A plurality of taps 21–27 are serially connected to the optical fiber 1 for transmitting information to the receiver 5, preferably to a central head end receiver, the information preferably being multiplexed onto the fiber, preferably by time division multiplexing. The system 12 illustrated in FIG. 1 further includes a head end transmitter 6 for sending information downstream along read fiber 31 which is tapped by a plurality of taps 41–47 so as to enable subscriber terminal equipment 32 to conduct two-way communication with equipment located external to the system 12, or alternatively with other subscriber terminal equipment included within the system 12. The subscriber terminal equipment can include any combination of telephones, video receivers, computers, etc. Optionally, branched networks 10 can be included within the system 12, the branched networks 10 communicating with the bus fibers 1, 31 via branch taps 7, 8, as illustrated. The number of taps 21–27, 41–47, 7, and 8 connected to the bus fibers 1, 31 is limited primarily by available bandwidth of the system 12 and optical power, and can generally be in excess of 10, 20, 30, 40, or 50, for example.

Remote taps 21, 22 inject light into the write optical fiber 1 at a distance relatively far from the optical receiver 5, and since such signals are attenuated by upstream taps 23–27, 7, 8 and also by the optical fiber between the taps 21, 22 and the receiver 5, the power levels thereof received by the receiver 5 are relatively low. Conversely, a detected power level of signals injected by near taps 26, 27 relatively close to the receiver 5 are relatively high due to the lack of a significant number of taps and length of fiber between the taps 26, 27 and the receiver 5. Optical signal power levels received by the optic receiver 5 from intermediate taps 23–25 generally have intermediate power levels, and the result of such a bus construction is that the optic receiver 5 must be able to power hop across a relatively large power range so as to be able to correctly discern information represented by dim optical signals injected by the remote taps 21, 22 and bright signals injected by near taps. Accordingly, the optical receiver is required to have a relatively large dynamic range in addition to a sensitivity required to detect the dimmest signals, unless radically different optical power intensities are generated by the various taps, and these intensities are accurately controlled.

According to the invention, the optical fiber 1 is a multimode fiber, either step or graded index, preferably a glass-on-glass graded index optical fiber having a silica glass core and cladding, and at least some of the taps 21–27 are of the type wherein the light injected thereby creates a mode volume distribution which is different and on average higher than an equilibrium mode volume distribution for the optical fiber in its installed state. One example of such a tap 21 is illustrated in FIG. 2, the tap 21 being of the type whereby an optical signal 18 is injected into an optical fiber core 30 by passing the light through an optical coupler 29, a side of the fiber cladding 20, and preferably through a side of an outer protective coating 19 thereof at a bend. Though such a tap is capable of injecting inner or lower ordered modes into the optical fiber, on average the intensity of outer or higher ordered modes injected is relatively high as compared to that for the inner or lower ordered modes, and a typical graph of the intensity distribution of modes injected by such a tap measured immediately downstream therefrom is skewed towards the higher order modes as compared to the equilibrium mode distribution. Taps which inject locally as illustrated in FIG. 2 are more fully described in U.S. Pat. No. 4,664,732, pending now U.S. Pat. Nos. 4,741,585, 4,768,854; and 4,741,585, the disclosures of which are incorporated herein by reference.

The invention is operable and utilizable in any network which utilizes any type of tap which initially injects a mode volume distribution which is skewed in intensity towards higher order modes rather than lower order modes as compared to an equilibrium distribution for the fiber. When the taps have a construction such as that of FIG. 2, even more advantageous results are obtained since taps downstream from the tap 21 preferentially withdraw outermost modes of optical signals previously being injected thereinto. Hence, the equilibrium mode distribution for the fiber in its installed state is skewed in intensity towards the lower order modes such as is illustrated by reference numeral 17 in FIG. 3 as compared to an equilibrium distribution for the fiber as illustrated by reference numeral 15 in FIG. 3. Nevertheless, numerous types of taps are known in the art which are capable of injecting an optical signal into an optical fiber so as to have a mode volume distribution which is skewed in intensity towards the higher order modes as compared to that for equilibrium. The invention is also useful for any distribution protocol being used, e.g. ring, bus or star, for the system.

FIG. 3, which is a graph whose horizontal axis corresponds to points along a diameter of the fiber and whose vertical axis corresponds to relative optical intensities, illustrates a typical mode volume distribution 14 for a tap such as that illustrated in FIG. 2 immediately downstream of a location of signal injection. Reference numeral 15 illustrates an equilibrium mode distribution for the fiber as manufactured, and reference numerals 16 and 17 illustrate two alternative typical equilibrium mode distributions for the fiber 1 in its installed state, the actual distribution depending on the types and density of the taps 21–27, 7, 8. As FIG. 3 illustrates, the initial distribution of modes injected by the tap 21 is skewed a very large amount towards the outermost modes as compared to either the fiber equilibrium mode distribution or a variety of possible equilibrium mode distributions for the fiber in its installed state. Accordingly, assuming a sufficiently long distance between the remote taps 21, 22 and the optical receiver, the optical signals have a power distribution at the fiber end such as that illustrated by either reference numeral 16 or 17 rather than a shape such as that illustrated by reference 14 due to continuous mode volume redistribution and attenuation induced by the fiber, cabling, and optical taps 23–27, 7, 8. However, the near taps 26, 27 are generally not disposed sufficiently far away from receiver connector 3 for equilibrium mode volume redistribution to have occurred so that the mode volume distribution of signals injected by such taps more closely resemble that as illustrated by reference numeral 14 than reference numerals 15–17.

According to the invention, a mode filter 4 is disposed between the end 11 of the optical fiber 1 and the optical receiver 5 which functions to preferentially attenuate outermost or higher order modes as opposed to innermost or lower order modes. The net result is that optical signals injected by the near taps 26 or 27 which have a relatively high intensity for the higher order modes are attenuated to a greater degree than are optical signals injected by remote taps 21 or 22 which have reached or nearly reached equilibrium and hence have a relatively low intensity for the higher order modes. Since the nearer taps 26 and 27 create optical signals which are brighter than the remote taps 21 or 22 at the receiver 5, the effect of the mode filter is to reduce the dynamic range required by the optical receiver while having a minimal effect on attenuating the dimmest optical signals since they are very lean in outer mode intensity so as to not require that the optical receiver have an unduly increased receiver sensitivity.

EXAMPLE 1

One thousand meters of 85/125 micrometer graded index glass-on-glass fiber had attached thereto 10 write taps which each functioned to inject an optical signal into a core of an optical fiber using the principle of FIG. 2, the taps being disposed at varying distances from an optical receiver at an end of the fiber. Each tap was successively powered with a constant current source so as to yield a first power curve with no filter in place, and thereafter separate measurements were taken with an optical filter disposed between the end of the optical fiber and the optical receiver. The optical filter was a short length of glass-on-glass optical fiber (62.5/125 micron), and the power measurements with the filter in place are illustrated by a second power curve 52 illustrated in FIG. 6. The actual power difference between the measurements with and without the filter in place as a function of the distance of each tap from the receiver is illustrated in FIG. 7. As FIG. 7 illustrates, the filter caused a 4.5 dB reduction of a detected signal for the tap closest to the optical receiver, and a 0.3 dB reduction of a detected signal for the most distant tap. Accordingly, the invention reduced the dynamic range by 4.2 dB while requiring an optical receiver which only needs an additional 0.3 dB sensitivity.

Two preferred embodiments of a mode filter of the invention are illustrated in FIGS. 4a and 4b. Reference numeral 56 represents lower order modes within the bus fiber 1, reference numeral 57 refers to higher order modes within the fiber 1, and reference numeral 4 represents the mode filter. As FIG. 4a illustrates, the filter 4 is constructed so as to have a smaller size than fiber 1 which causes some of the outermost modes in the fiber 1 to not be injected into the filter 4 and hence propagated thereby. Accordingly, outermost modes are preferentially attenuated over lower order modes.

FIG. 4b illustrates an alternative mode filter 4b which has a cone of acceptance which is smaller than that of the fiber 1, again with the result that higher order modes are preferentially attenuated rather than lower order modes. Specifically, due to the lower cone of acceptance of the filter 4b, e.g. its lower numerical aperture, higher order modes escape from the core of the filter 4b into its cladding in the case of a waveguide and are attenuated by a coating or buffer material around the waveguide, and/or by the waveguide cladding.

In FIG. 4b, the cone of acceptance of the fiber 1 is represented by the ½ angle $\theta$, and the cone of acceptance of the filter 4b is represented by the ½ angle $\phi$, and as indicated $\phi$ should be less than $\theta$, if the filter is to be equal in cross-sectional size or larger than the fiber 1.

Another embodiment is to choose a filter which is a waveguide having a cross-sectional size which is smaller than the fiber 1, and which has a smaller cone of acceptance as well.

A further embodiment is to choose a filter which comprises means for bending a length of the distributive optical fiber located downstream of the brightest or nearest tap to the receiver about a radius of curvature which is significantly smaller than a minimum bend radius for the fiber. This results in higher or outermost modes being attenuated to a larger degree than lower or innermost modes. A length of the fiber and its bend radius profile can be chosen to achieve any desired amount of attenuation, and preferably means should be included which allow the length and bend radius to be varied so as to be able to vary the amount of attenuation until an optimum value is obtained within the confines of other system limitations (e.g. receiver sensitivity).

A preferred embodiment of such means is illustrated in FIG. 5 which shows an end portion 61 of the distributive fiber 1 bent in a plurality of turns by bars 62, 63. Preferably one of the bars 63 is movable as represented by opposed arrows 64 to allow the fiber bend radius to be changed. By appropriately varying a distance 65 between the bars 62, 63, and the number of turns or loops of the end portion between the bars, various attenuation values can be obtained and monitored until a desired dynamic range reduction has been obtained in combination with an acceptable amount of additional attenuation to the most remote tap or weakest system tap as perceived by the receiver.

EXAMPLE 2

Four kilometers of graded index fiber had 24 taps attached thereto which induced macrobends to the fiber similar to that illustrated in FIG. 2 so as to be capable of injecting light into the fiber thereat. A Photodyne power meter was placed at an end of the bus fiber, and a tap nearest to the receiver was located 55 meters therefrom. A tap furtherest from the receiver was located 4 kilometers from the receiver. Both the nearest and furtherest taps were powered by a 5018-000 Lytel lensed LED driven with 100 milliamps DC from a MA/COM350 current source. The near and far taps were separately powered, and intensities detected therefrom were measured, with a difference therebetween being the dynamic range of the bus without any filter in place. Thereafter, an end portion of the fiber closest to the receiver and downstream from the nearest tap was wrapped as illustrated in FIG. 5 so as to impose a minimum bend radius of approximately 4.45 mm, and additional power measurements were made for each successive turn imposed on the end portion of the fiber, measurements being made for 1, 2, 3, 4, and 5 turns respectively. In each case, the absolute value of the dynamic range was recorded, and the results therefrom are illustrated in FIG. 8. FIG. 9 represents the excess loss or attenuation induced to the furtherest tap by the various fiber turns.

As FIG. 8 illustrates, the dynamic range of the system with no filter in place was initially approximately 17 dB. For a filter comprising one fiber turn, the dynamic range was reduced to approximately 7.5 dB, the dynamic range progressively being reduced until it was approximately only 1 dB for four fiber turns. With five fiber turns, an intensity of an optical signal generated by the nearest tap was actually reduced to a value below that recorded for the furtherest tap, and the absolute value of the difference therebetween actually increased to 2 dB. This phenomenon is explained due to the fact that the fiber turns more strongly attenuate outermost than innermost modes, and since the nearest tap is relatively weak in innermost modes since little mode redistribution is able to occur prior to the mode filter, five fiber turns essentially strip off all significant outermost modes leaving only the innermost modes for the nearest tap remaining, and an intensity value thereof is actually less than that for the furtherest tap due to the mode redistribution that occurs to the signal generated thereby by the intervening taps.

FIG. 9 illustrates the attenuation in dB for the optical signal generated by the furtherest tap by the various fiber turns, and this figure indicates that this attenuation is between 1.1 and 1.6 dB, a very acceptable attenuation given the drastic reduction in dynamic range.

A further embodiment of the invention is to create a plurality of discrete macrobends in the near portion 61 of the optical fiber between the optical receiver and the nearest tap, such discrete macrobends being readily created by disposing a plurality of inactive write or read taps similar in construction to those used on the fiber 1 or 31. FIG. 10 illustrates such a mode filter, with the inactive write taps being identified by reference numeral 68, and the near tap being identified by reference numeral 27. Again, a length of the optical fiber 1 bent by any one of the inactive taps 68, as well as a bend radius generated thereby, can be varied until acceptable attenuation and dynamic range reduction values are obtained, and the number of inactive taps 68 can also be varied as well to achieve such optimum values.

With the invention, the dynamic range can be reduced by more than any one of 1, 2, 3, 4, 5, 7, 10, 13, 15, and even 20 dB, with only minor increases in an attenuation to a dimmest signal on the distribution fiber.

Though the invention has been described by reference to specific and preferred embodiments thereof, the invention is not to be limited thereby and only by the appended claims.

We claim:

1. An apparatus for reducing a dynamic range for an optical receiver, comprising:
   a multimode optical fiber;
   a series of write taps serially disposed on the optical fiber;
   an optical receiver located downstream of the series of write taps and having means for receiving light from the optical fiber;
   means disposed between the optical fiber and the optical receiver for attenuating a magnitude of an optical signal generated by a write tap nearest to the receiver substantially more than a magnitude of an optical signal generated by a write tap furtherest from the receiver, a difference between the attenuations being in excess of 1.0 dB.

2. The apparatus of claim 1, the difference being in excess of 3.0 dB.

3. The apparatus of claim 1, the difference being in excess of 5.0 dB.

4. The apparatus of claim 1, the difference being in excess of 10 dB.

5. The apparatus of claim 1, the series of write taps injecting light into the optical fiber at sequential bends in the optical fiber by passing the light through a side of an intermediate section of a cladding of the fiber so as to initially produce an optical signal within a core of the optical fiber which has outermost modes of substantial greater intensity than when at equilibrium.

6. The apparatus of claim 5, the optical fiber having a first numerical aperture, the attenuating means comprising a waveguide having a second numerical aperture, the second numerical aperture being smaller than the first numerical aperture.

7. The apparatus of claim 5, the attenuating means comprising a waveguide having a smaller cross-sectional area than the fiber.

8. The apparatus of claim 7, the waveguide comprising a second optical fiber having a diameter smaller than the aforesaid fiber.

9. The apparatus of claim 5, the attenuating means comprising means for bending the fiber about a radius of curvature smaller than its minimum bend radius and about a total length so as to substantially preferentially attenuate outermost modes rather than innermost modes.

10. The apparatus of claim 9, the bending means comprising first and second opposed bars, a part of the optical fiber being looped between the bars.

11. The apparatus of claim 9, the bending means comprising a series of inactive taps.

12. An optical fiber distribution system for distributing information for a plurality of subscriber terminals, comprising:
    a plurality of subscriber terminals;
    first means for sending information to each of the terminals;
    an optical receiver;
    an optical fiber;
    a series of taps serially disposed on the optical fiber for injecting a series of optical signals into the optical fiber from the subscriber terminals, each tap injecting its corresponding signal in a manner so as to initially produce within a core of the optical fiber an optical signal which has a power distribution substantially skewed in intensity towards outermost modes as compared to an equilibrium power distribution for the fiber;
    means disposed between the optical fiber and the optical receiver for attenuating a magnitude of an optical signal generated by a tap nearest to the receiver substantially more than a magnitude of an optical signal generated by a tap furtherest from the receiver, a difference between the attenuations being in excess of 1.0 dB.

13. The system of claim 12, in which the attenuating means include a mode filter comprising a waveguide having a smaller numerical aperture than the optical fiber.

14. The system of claim 13, the filter comprising a waveguide having a smaller diameter than the optical fiber.

15. The system of claim 12, the difference being in excess of 5 dB.

16. The system of claim 12, the difference being in excess of 10 dB.

17. The system of claim 12, the subscriber terminals including telephones.

* * * * *